United States Patent [19]

Asada et al.

[11] Patent Number: 4,574,055

[45] Date of Patent: Mar. 4, 1986

[54] RESISTOR COMPOSITIONS

[75] Inventors: Eiichi Asada, Tokyo; Toshio Inokuma, Fujisawa; Mikio Yamazoe, Oume, all of Japan

[73] Assignee: Shoei Chemical Inc., Tokyo, Japan

[21] Appl. No.: 680,640

[22] Filed: Dec. 12, 1984

[30] Foreign Application Priority Data

Jan. 6, 1984 [JP] Japan ............................ 59-595

[51] Int. Cl.$^4$ ..................... H01B 1/02; H01B 1/06
[52] U.S. Cl. ............................. 252/514; 252/518; 252/521; 106/1.13; 106/1.14; 106/1.15
[58] Field of Search ............... 252/518, 514, 521; 106/1.13, 1.14, 1.15, 1.24, 1.25, 1.28

[56] References Cited

U.S. PATENT DOCUMENTS

| | | | |
|---|---|---|---|
| 3,560,410 | 2/1971 | Schubert | 252/518 |
| 3,583,931 | 6/1971 | Bouchard | 252/520 |
| 3,681,262 | 8/1972 | Bouchard | 252/520 |
| 4,124,539 | 11/1978 | Horowitz et al. | 252/518 |
| 4,175,061 | 11/1979 | Fujimura | 252/518 |
| 4,225,468 | 9/1980 | Donohue et al. | 252/518 |
| 4,302,362 | 11/1981 | Hoffman et al. | 252/518 |
| 4,312,770 | 1/1982 | Ju et al. | 252/518 |
| 4,362,656 | 12/1982 | Hormadaly | 252/518 |
| 4,439,352 | 3/1984 | Asada et al. | 252/518 |
| 4,476,039 | 10/1984 | Hormadaly | 252/518 |

*Primary Examiner*—Josephine L. Barr
*Attorney, Agent, or Firm*—Flynn, Thiel, Boutell & Tanis

[57] ABSTRACT

A resistor composition comprising conductive particles, a glass frit and a vehicle in which $RuO_2$ particles coated with a polynary oxide of Bi and/or Pb and Ru are employed and, by using the surface-coated $RuO_2$, the composition can provide readily a improved resistor having a advantageous combination of properties, particularly a very small absolute TCR and high voltage stability throughout a wide resistance range. The produced resistor can be successfully laser-trimmed without adversely affecting the properties thereof.

8 Claims, No Drawings

RESISTOR COMPOSITIONS

BACKGROUND OF THE INVENTION

The present invention relates to ruthenium oxide resistor compositions adapted to be fired onto an electrically insulating substrate to a form resistive film pattern. More particularly, the present invention relates to improved resistor compositions having superior properties which especially render the compositions highly suited for the production of resistors in the ranges of intermediate resistance values to high resistance values.

As ruthenium oxide resistor compositions, there have heretofore been known various compositions. For example, as disclosed in U.S. Pat. No. 3,304,199, $RuO_2$-glass system resistor compositions have been extensively employed since the compositions provide resistors having a wide resistance range of from a few ohms per square to a few megohms per square by varying the proportions of $RuO_2$ and glass. However, such resistor compositions are disadvantageous in that the changes in resistance due to changes in temperature, namely, the temperature coefficient of resistance (hereinafter referred to as TCR) shifts in a negative direction with increasing the proportion of glass and, thus, in the ranges of the intermediate resistance to the high resistance using a higher content of glass, the TCR value becomes more negative and, at the same time, noise is also unfavorably increased. It is highly desirable that resistors have a stable resistance which is not essentially affected by changes in temperature, in other words, its absolute TCR is as small as possible and, ideally, zero. Thus, the use of various TCR modifiers have been attempted in the conventional resistor composition in a view to bringing TCR close to zero. For example, copper oxide (U.S. Pat. Nos. 3,304,199 and 3,324,049), colloidal AlOOH (British Patent No. 1 470 497), lanthanum oxide, neodymium oxide, praseodymium oxide, samarium oxide and/or glass containing these oxides (U.S. Pat. No. 4,439,352) have been employed in order to shift TCR in the positive direction. These conventional additives improve TCR, but, simultaneously, cause an unfavorable reduction of resistance or affect disadvantageously a noise and laser-trimming property. As other method7 of adjusting TCR, the use of coarse $RuO_2$ and glass has been proposed. However, this method causes a detrimental increase of noise level and a wide variations in resistance and, thus, is not useful in practical application.

Further, $RuO_2$-glass resistors have the disadvantage that microcracks are apt to occur during adjusting resistance by means of laser-trimming and their electrical properties and stability are detrimentally affected with the growth of the microcracks. Particularly, this tendency is remarkable in resistors having a higher resistance, for example 10 kΩ per square or higher, and further magnified by addition of the foregoing TCR modifiers. Perhaps, the cause for this is that thermal strain is apt to occur due to properties of the used glass and the poor wettability or compatibility between $RuO_2$ and the glass. On the basis of such consideration, many studies and attempts have been made on glass composition, $RuO_2$ particle size, etc., but any satisfactory solution has not been found up to date, because the laser-trimming ability cannot be improved without sacrificing the other properties, such as TCR.

U.S. Pat. Nos. 3,583,931 and 3,681,262 disclose resistor compositions comprising a polynary oxide with a pyrochlore-related crystal structure, for example, $Bi_2Ru_2O_7$ or $Pb_2Ru_2O_6$, and glass. The resistor compositions have a relatively good laser-trimming property and their TCR can be readily adjusted, as compared to the foregoing $RuO_2$ resistor composition. However, the Pyrochlore-related oxide resistors present problems in breakdown voltages and noise and in order to precisely control their properties, it is required stringently to regulate a firing condition or other process conditions. Thus, the pyrochlore-related oxide resistors do not provide satisfactory utility in practical use.

Further, as discribed in Japanese Patent Publication No. 56-28 363, glass forming constituents and ruthenium oxide are in advance fused and vitrified. The resulting glass contains crystalline precipitates of $Pb_2Ru_2O_6$ or of the oxide and $RuO_2$ therein and is employed for the preparation of resistors. Further, Japanese Patent Publication No. 56-22 361 proposes a method of precipitating pyrochlore structure crystal through the reaction of $RuO_2$ and glass during firing resistor compositions. However, in either case, it is very difficult to precisely control properties by the process conditions and an unfavorable wide variation in resistance will be resulted.

Under such circumstances, there is a great demand for resistor compositions which can develop a better combination of properties, for example, minimized TCR, good laser-trimming property, low noise, increased voltage stability, etc., in fired resistor films.

SUMMARY OF THE INVENTION

It is therefore an object of the present invention to eliminate the above disadvantages associated with the prior art, and particularly to provide improved resistor compositions which can afford resistors having an advantageous combination of properties, particularly, remarkably reduced absolute TCR and noise level, higher voltage stability and excellent laser-trimming property, over the entire resistance range.

According to the present invention, there is provided resistor compositions comprising finely divided conductive particles, a glass frit and a vehicle, wherein the conductive particles are at least in part $RuO_2$ particles having a polynary oxide coating of Bi and/or Pb and Ru on the surface thereof.

By using the special coated $RuO_2$, the objects contemplated by the present invention could be achieved and the disadvantages encountered in the prior art were entirely eliminated without accompanying any adverse effect. These and other objects, features, and advantages of the present invention will become more apparent by referring to the following detailed description.

DETAILED DESCRIPTION OF THE PREFERRED EMBODIMENTS

In view of the foregoing, many studies and extensive experiments have been conducted using, as a conductive component, a mixture of $RuO_2$ particles and pyrochlore-related Ru-containing polynary oxide particles, but contrary to inventors' expectations, any significant improvement in TCR and laser-trimming properties could not be attained. Further, there were not obtained satisfactory results in noise level and breakdown voltage.

The major reasons why $RuO_2$-glass resistors have a much more negative TCR in a high glass content are considered to be that glass itself has a negative TCR and, owing to a poor wettability between $RuO_2$ and glass in resistors, a very thin semiconductive glass layer formed at the $RuO_2$-glass interface and dissolving a very slight amount of $RuO_2$ therein has an increased resistance and a more negative TCR. Stability in resistance after laser-trimming is also considered to depend primarily on the wettability between glass and $RuO_2$ and, thus, the higher the resistance, the lower the stability. On the basis of such experimental information and consideration, the inventors' attention was directed to the interface region of $RuO_2$ particles and glass and various treatments were attempted on the interface area in a view to improving the wettability or compatibility of this region. As a result of an extensive investigation, it was found that when $RuO_2$ particles coated with a polynary oxide coating of Bi and/or Pb and Ru thereon is employed as a conductive component, the disadvantages encountered in the prior art can be eliminated and the present invention was reached on the basis of such finding.

The present invention resides in resistor compositions comprising finely divided conductive particles, a glass frit and a vehicle, the conductive particles being at least in part $RuO_2$ particles having a polynary oxide coating of Bi and/or Pb and Ru.

As conductive particles of the resistor compositions of the present invention, polynary oxide-coated $RuO_2$ particles set forth above may be either alone or in combination with uncoated $RuO_2$ particles. In addition to the foregoing conductive particles, Ag, Au, Pd and other conductive particles may be contained in the compositions according to the aimed purpose.

The $RuO_2$ particles having the coating of the polynary oxide has a much higher effect than uncoated $RuO_2$ particles in shifting the TCR in the positive direction and, whereby the former particles can maintain the TCR at positive values up to 1 M$\Omega$ per square. Therefore, TCR can be readily controlled close to zero, for example, within the ranges of 50 ppm/° C. throughout the entire resistance ranges, by employing the coated $RuO_2$ particles singly for the high resistance ranges and by combining the same with prior art $RuO_2$ in proper proportions for the ranges of a low resistivity to an intermediate resistance. The conventional TCR modifiers have been added as foreign substances to $RuO_2$-glass resistor compositions and, thus, could not be allowed to uniformly distribute throughout the resistor composition, causing a wide variation of properties. Whereas the compositions of the present invention containing the coated $RuO_2$ particles are very uniformly dispersed, whereby the variation in their properties is extremely small and their properties are greatly improved. Further, the resistor compositions of the present invention exhibit a higher voltage withstanding ability, a significantly decreased noise level and a high stability to soldering and thermal shock.

Since the $RuO_2$ particles having the polynary oxide coating, which are employed as conductive particles in the present invention, are mainly composed of finely divided $RuO_2$ with a high stability, the surface-coated particles themselves also have a very fine size and a high thermal-stability. As an example of prior art methods for producing pyrochlore-related polynary oxide, in U.S. Pat. No. 3,583,931, pyrochlore-related oxide particle is produced by melting the raw material oxides, solidifying and then mechanically milling. The pyrochlore-related oxide particles thus obtained are coarse and such coarse particles are considered to have a detrimental effect on breakdown voltage and noise. Contrary to the prior art, the composition of the present invention is superior in these properties. In addition to the foregoing advantages, since microcracks, which may be caused by laser-trimming, are greatly reduced, any detrimental effect is not caused due to laser-trimming and good stability can be obtained. Such advantages are thought to be due primarily to an improved wettability of the $RuO_2$-glass interface.

The $RuO_2$ particles having the coating of polynary oxide of Bi and/or Pb and Ru may be produced by wet- or dry-process or other any suitable known method. Generally, Bi and/or Pb or compounds thereof are adhered to the surface of $RuO_2$ particles by means of various known techniques and calcined to form the polynary oxides on the surface of $RuO_2$ particles through the reaction Bi and/or Pb components with the surface of $RuO_2$. For example, in a wet-method, $RuO_2$ particles are dispersed in a solution of water-soluble Bi and/or Pb salts and Bi and/or Pb compounds are precipitated on the $RuO_2$ particles with the aid of an appropriate precipitant such as alkali. The $RuO_2$ particles thus treated are then calcined. As other methods, the surface-coated $RuO_2$ particles can be prepared by depositing Bi and/or Pb in a thickness of about 100 Å onto the surface of powdered $RuO_2$ by means of evaporation, sputtering, plating, etc. and calcinating, whereby forming a thin polynary oxide coating on the surface of $RuO_2$. Calcination is preferably carried out by heating at a temperature of 700° to 900° C. for a period of about one to ten hours in an oxidizing atmosphere. Since the particle size of the coated $RuO_2$ particles prepared by the above mentioned methods is determined by the particle size of the core $RuO_2$ particles to be coated, the particle size of the coated $RuO_2$ can be readily controlled.

The polynary oxide formed on $RuO_2$ by the above mentioned procedures is typically pyrochlore-related polynary oxide containing Bi and/or Pb and Ru.

The amount of the polynary oxide coating is preferably from 1 to 25 mol % with respect to the total amount of the coated $RuO_2$ including the polynary oxide coating. When the amount exceeds 25 mol %, the coating of the polynary oxide becomes too thick and sintering between the particles unduly takes place, resulting in an excessive grain growth. On the other hand, an insufficient amount less than 1 mol % will make it difficult to form a uniform coating.

As $RuO_2$ particles to be coated with the polynary oxide, it is preferable to employ well-crystallized $RuO_2$ fine particles havi specific surface area of approximately 5 to 80 m$^2$/g. Particle size greater than the upper limit will exert detrimental effects on noise and breakdown voltage and thus such large particle size is unfavorable. On the other hand, when particle size is too small, sintering between adjacent particles excessively proceeds in the course of reaction with Bi and/or Pb components, whereby an unfavorable grain growth tends to occur. $RuO_2$ particles crystallized to a high degree prevent the grain growth caused during calcination and successfully provide fine particles having the coating of the polynary oxide and a specific surface area of about 5–60 m$^2$/g. Further, since such well-crystallized fine $RuO_2$ particles have a low reactivity, the reaction of Bi and/or Pb components with $RuO_2$ are occurred only at the surface cf $RuO_2$ particles and the structure of the coated $RuO_2$ particles is maintained during firing the resistor composition without any change.

In the resistor composition of the present invention, $RuO_2$ particles employed in conventional $RuO_2$ resistors may be employed in mixture with the foregoing polynary oxide-coated $RuO_2$ particles. The uncoated $RuO_2$ particles have preferably a specific surface area of about 5 to 60 $m^2/g$. When the particle size of $RuO_2$ is finer beyond the lower limit, it is impossible to provide resistor pastes having satisfactory properties. On the other hand, a large particle size outside of the range will adversely affect laser-trimming property.

The weight ratio of the $RuO_2$ particles having the polynary oxide coating to the uncoated $RuO_2$ particles is about 5:95 to 100:0 and the ratio may be appropriately varied depending upon the resistance and other properties desired in the ultimate products.

Glass frit useful in the present invention may be of any well-known glass usually used in the art and, particularly, lead borosilicate glass, alkali earth metal borosilicate glass, aluminum lead borosilicate glass, zinc lead borosilicate glass, etc. may be employed as preferred glass. The particle size of glass frit is not larger than 10 $\mu m$, and preferably from 0.3 to 3 $\mu m$. The weight ratio of conductive particles to glass is properly determined depending on the desired resistance within the range of approximately 60:40 to 5:95.

Further, the resistor compositions of the present invention may contain an appropriate organic or inorganic vehicle selected from the conventional vehicles employed in the art. Preferred examples of the vehicles for the purpose are well-known solvents, such as terpineol, buthyl carbitolacetate (registered trademark), the like; and mixtures of the foregoing solvents with resins such as ethyl cellulose, nitrocellulose, alkyd resins, etc. The amount of the vehicle may vary depending primarily upon the manner in which the resistor composition is applied onto a substrate.

If necessary, in addition to the vehicle, the resistor composition of the present invention may also contain one or more metallic oxide additives, for example, copper oxide, manganese oxide, lanthanum oxide, neodymium oxide, samarium oxide, praseodymium oxide, alumina, silica, niobium oxide, or the other well-known additives in amounts up to about 20 wt. % based on the combined weight of the conductive component and the glass frit, in a view to improving properties such as TCR, re-firing property or size effect. The resistors of the present invention are superior to the conventional resistors in uniformity and, thus, the addition of the foregoing additives have no adverse effect on their properties. The metal oxide additives may be also incorporated as glass-forming constituents into the glass.

In practice of the present invention, usually the resistor composition is thoroughly dispersed in a suitable vehicle to form a printing paste, printed onto an electrically insulating substrate and dried. The layer thus formed is then fired in air at a temperature of about 700° to 900° C. to produce a fired resistor film. The compositions of the present invention are very useful particularly in the production of the resistors in the reistance ranges from intermediate resistance to high resistance, i.e. 100 ohms per square or higher.

The present invention will now be described hereinafter with reference to the detailed examples. Unless otherwise indicated, parts specified in the following examples are all by weight part.

$RuO_2$ particles having a coating of polynary oxide of Bi and/or Pb and Ru thereon were produced in the following manner. Hereinafter the polynary oxide-coated $RuO_2$ particle is referred to as "coated particle".

PRODUCTION EXAMPLE 1

(Coated Particle A)

198.0 g of $Bi(NO_3)_3$ was dissolved in 1 liter of water and 266.0 g of $RuO_2$ particles with a specific surface area of 25 $m^2/g$ were dispersed in the $Bi(NO_3)_3$ aqueous solution. A KOH aqueous solution was prepared by dissolving 100 g of KOH in 100 ml of water and added into the $RuO_2$ dispersion to deposit Bi in the form of $Bi(OH)_3$ onto the $RuO_2$ particle surface and coprecipitate with the $RuO_2$ particles.

The resulting particles were filtered, dried and calcined at 900° C. for two hours to form a Bi-Ru polynary oxide coating containing $Bi_2Ru_2O_7$ as a main component on the $RuO_2$ particle surface. The produced amount of the polynary oxide was about 14 mol % of the total amount of the coated particle A thus obtained.

PRODUCTION EXAMPLE 2

(Coated Particle B)

122.5 g of $Pb(NO_3)_2$ was dissolved in 1 liter of water and 266.0 g of $RuO_2$ particles with a specific surface area of 25 $m^2/g$ were dispersed in the aqueous $Pb(NO_3)_2$ solution. A KOH aqueous solution was prepared by dissolving 70 g of KOH in 100 ml of water and added into the $RuO_2$ dispersion to deposit Pb in the form of $Pb(OH)_2$ onto the $RuO_2$ particle surface and coprecipitate with the $RuO_2$ particles.

Thereafter, the resulting $RuO_2$ particles were treated in the same way as described in the latter part of Production Example 1 and there were formed a Pb-Ru polynary oxide coating containing $Pb_2Ru_2O_6$ as a main component on the $RuO_2$ particle surface. The amount of the polynary oxide was about 10 mol % of the total amount of the coated particle B thus obtained

PRODUCTION EXAMPLE 3

(Coated Particle C)

99.0 g of $Bi(NO_3)_2$ and 82.8 g of $Pb(NO_3)_2$ was dissolved in 1 liter of water and 266.0 g of $RuO_2$ particles with a specific surface area of 25 $m^2/g$ were dispersed in the aqueous solution $Bi(NO_3)_3$ and $Pb(NO_3)_2$. A KOH aqueous solution was prepared by dissolving 70 g of KOH in 100 ml of water and added into the $RuO_2$ dispersion to adhere deposits $Bi(OH)_3$ and $Pb(OH)_2$ onto the $RuO_2$ particle surface and coprecipitate with the $RuO_2$ particles.

Thereafter, the resulting $RuO_2$ particles were treated in the same way as described in the latter part of Production Example 1 and there were obtained a coating of polynary oxide containing Bi, Pb and Ru. The amount of the polynary oxide was about 14 mol % of the total amount of the coated particle C thus obtained.

In the following, exemplary compositions were prepared using the treated particles produced above and glass frit with an average diameter of 0.5 $\mu m$, the glass consisting of 54% PbO, 35% $SiO_2$, 8% $B_2O_3$ and 3% $Al_2O_3$.

EXAMPLE 1

30 parts of the coated particle A and 70 parts of the glass frit were thoroughly mixed in the vehicle prepared by dissolving ethyl cellulose in terpineol to provide a uniform resistor composition in a paste form. The paste was screen-printed onto an alumina substrate, dried at 150° C. for 10 minutes and then fired in an electric furnace with a peak temperature of 850° C. for 10 minutes to form a resistor film having a pattern of 1 mm×1 mm.

Further, resistors of Examples 2 and 3 were prepared in the same procedures as described in Example 1, except for using the coated patricles B and C and the glass frit in the respective proportions indicated below.

EXAMPLE 2

Coated particle B produced in Preparation Example 2: 30 parts
Glass Frit: 70 parts

EXAMPLE 3

Coated particle C produced in Preparation Example 3: 30 parts
Glass Frit: 70 parts The respective resistors obtained in Examples 1 to 3 were tested on resistance, TCR (from room temperature to +125° C.), noise level, breakdown voltage and resistance drift after laser-trimming. The results are shown in Table 1 below. On evaluation of the resulted values, more negative noise level and highly reduced absolute values of TCR, breakdown voltage and drift in resistance after laser-trimming are desirable for resistors. The measurements of the breakdown voltage and laser-trimming were made in the following ways.

Breakdown Voltage:

Percentage change in resistance after 10,000 cycles of intermittent overload comprising AC voltage application of a maximum voltage of 400 V for 1 second and then interruption of the voltage application for 25 seconds.

Laser-trimming:

Each resistor was straight cut off so as to leave 1/5 of the initial width of the resistor film, using a laser-trimmer.

COMPARATIVE EXAMPLES 1 TO 3

Comparative resistors having almost the same resistances as those of the foregoing resistors were prepared in the same procedures as in Example 1 except for using, as conductive component, uncoated $RuO_2$ particles, pyrochlore-related $Bi_2Ru_2O_7$ particles (hereinafter referred to as "pyrochlore particles") and a mixture of pyrochlore particles and the uncoated $RuO_2$ particles, respectively. The comparative resistors were tested in the same way as described in Example 1 for comparison with the resistors of the present invention. The proportions of the conductive component and glass frit and the test results are given in Table 1.

The pyrochlore particles employed in the comparative resistors were produced by mixing 13.3 g of $RuO_2$ and 23.3 g of $Bi_2O_3$, shaping into the pellet form, calcinating in air at 900° C. for 5 hours and grinding to an average particle size of 0.5 μm by a ball mill. The uncoated $RuO_2$ particle had a specific surface area of 25 $m^2/g$ and the glass was the same as the foregoing Examples.

EXAMPLES 4 AND 5 AND COMPARATIVE EXAMPLES 4 AND 5

Further resistors were prepared in the same manner as in Example 1, except that the conductive component and glass were varied as ahown in Table 2 and the resulting resistors were tested on their resistance and other properties. The test results are given in Table 2.

In Table 1 and Table 2, comparison of the resistors having almost the same resistance levels proves that the resistor composition of the present invention are far superior to the comparative resistor compositions prepared using the conventional conductive components.

TABLE 1

| Conductive Particles (part) | | | Glass Frit (part) | Sheet Resistivity (ohms/sq.) | TCR (ppm/°C.) | Noise (dB) | Breakdown Voltage (%) | Resistance Drift after Trimming (%) |
|---|---|---|---|---|---|---|---|---|
| Example Coated Particle | | | | | | | | |
| 1 | A | 30 | 70 | 135.5k | +30 | −2.0 | −0.55 | +0.35 |
| 2 | B | 30 | 70 | 123.6k | −5 | −5.0 | −0.82 | +0.30 |
| 3 | C | 30 | 70 | 170.2k | −2 | −3.0 | −0.93 | +0.50 |
| Comparative Example | | | | | | | | |
| 1 | $RuO_2$ | 15 | 85 | 209.7k | −185 | 0 | −1.20 | +1.60 |
| 2 | $RuO_2$ Pyrochlore Particle | 16 14 | 70 | 92.3k | −93 | 0 | −2.24 | +1.50 |
| 3 | Pyrochlore Particle | 30 | 70 | 231.4k | +128 | +5.0 | −10.5 | +0.60 |

TABLE 2

| Conductive Particles (part) | | | Glass Frit (part) | Sheet Resistivity (ohms/sq.) | TCR (ppm/°C.) | Noise (dB) | Breakdown Voltage (%) | Resistance Drift after Trimming (%) |
|---|---|---|---|---|---|---|---|---|
| Example Coated Particle | | | | | | | | |
| 4 | A | 23.5 | 76.5 | 1.043 M | +33 | +2.5 | −0.14 | +0.60 |
| 5 | B | 23 | 77 | 1.155 M | 0 | 0 | −0.11 | +0.61 |

TABLE 2-continued

| Conductive Particles (part) | Glass Frit (part) | Sheet Resistivity (ohms/sq.) | TCR (ppm/°C.) | Noise (dB) | Breakdown Voltage (%) | Resistance Drift after Trimming (%) |
|---|---|---|---|---|---|---|
| Comparative Example | | | | | | |
| 4 $RuO_2$ 10 | 90 | 2.173 M | −171 | +8.0 | −0.54 | +2.05 |
| 5 Pyrochlore Particle 25 | 75 | 1.540 M | +102 | +12.0 | −13.6 | +0.80 |

EXAMPLES 6 TO 8

Resistors were formulated in the same way as in Example 1, except for using the coated particles A and the uncoated $RuO_2$ particles in the respective proportions given in Table 3, as a conductive component. The obtained resistors were tested on resistance and TCR and the results are given in Table 3.

TABLE 3

| | Conductive Particle (part) | | | |
|---|---|---|---|---|
| Example | Coated Particle A | $RuO_2$ | Sheet Resistivity (ohms per square) | TCR (ppm/°C.) |
| 6 | 21 | 9 | 43.8k | +33 |
| 7 | 15 | 15 | 26.2k | +40 |
| 8 | 9 | 21 | 12.0k | +36 |

EXAMPLE 9 TO 11

Resistors were prepared in the same manner as in the case of Example 1, using the coated particle A, glass frit and metal oxide additives in the respective proportions. Their properties were examined in the same manner as the preceding examples and the results are shown in Table 4 below.

TABLE 4

| Example | Coated Particles A (part) | Glass Frit (part) | Metal Oxide Additive (part) | Sheet Resistivity (ohms/sq.) | TCR (ppm/°C.) | Breakdown Voltage (%) |
|---|---|---|---|---|---|---|
| 9 | 40 | 60 | $MnO_2$ 2 | 2.21k | +15 | — |
| 10 | 32 | 68 | $Nd_2O_3$ 5 | 137.3k | +39 | −0.15 |
| 11 | 32 | 68 | $Al_2O_3$ 8 | 160.2k | +10 | −0.20 |

As manifested from the test results, the resistor compositions of the present invention which contain, as a conductive component, $RuO_2$ particles having a coating of polynary oxide of Bi and/or Pb and Ru can successfully provide thick film resistors having a greatly reduced absolute TCR and satisfactory stability in the other properties thoroughout a wide resistance range.

What is claimed is:

1. A resistor composition comprising conductive particles, a glass frit and a vehicle, said conductive particles comprising particles selected from the group consisting of coated $RuO_2$ particles and a mixture of said coated $RuO_2$ particles and uncoated $RuO_2$ particles wherein the weight ratio of coated $RuO_2$ particles/uncoated $RuO_2$ particles is from 5/95 to 100/0, said coated $RuO_2$ particles having a polynary oxide coating of a metal component selected from the group consisting of (1) Bi and Ru; (2) Pb and Ru; and (3) Bi, Pb and Ru; the weight ratio of said conductive particles to said glass frit being in the range of 60:40 to 5:95.

2. A resistor composition as claimed in claim 1 in which said conductive particles consist of said coated $RuO_2$ particles.

3. A resistor composition as claimed in claim 1 in which said conductive particles consist of a mixture of uncoated $RuO_2$ particles and said coated $RuO_2$ particles.

4. A resistor composition as claimed in claim 1 containing up to 20 wt. % based on the combined weight of said conductive particles and said glass frit, of one or more metal oxide additives.

5. A resistor composition as claimed in claim 4 in which said metal oxide additives are selected from the group consisting of copper oxide, manganese oxide, lanthanum oxide, neodymium oxide, samarium oxide, praseodymium oxide, alumina, silica, and niobium oxide.

6. A resistor composition as claimed in claim 1, which also contains conductive particles of at least one metal selected from the group consisting of Ag, Au and Pd.

7. A resistor composition as claimed in claim 1, in which said glass frit has a particle size of not larger than 10 micrometers, said coated $RuO_2$ particles have a specific surface area of from about 5 to about 60 m²/g, and the amount of the polynary oxide coating is from 1–25 mol %, with respect to the total amount of said coated $RuO_2$ particles.

8. A resistor composition as claimed in claim 1, in which said coated $RuO_2$ particles have been prepared by coating the surfaces of $RuO_2$ particles with compounds of said metal component and then calcining said coated $RuO_2$ particles at 700° to 900° C., for from 1 to 10 hours, in an oxidizing atmosphere to convert the coating to said polynary oxide coating.

* * * * *